United States Patent [19]
Agesen et al.

[11] Patent Number: 6,101,580
[45] Date of Patent: Aug. 8, 2000

[54] APPARATUS AND METHOD FOR ASSISTING EXACT GARBAGE COLLECTION BY USING A STACK CACHE OF TAG BITS

[75] Inventors: Ole Agesen, Franklin; Steve Heller, Chelmsford, both of Mass.; Michael O'Connor, Union City, Calif.; Guy Steele, Lexington, Mass.; Marc Tremblay, Palo Alto, Calif.

[73] Assignee: Sun Microsystems, Inc., Palo Alto, Calif.

[21] Appl. No.: 08/838,971

[22] Filed: Apr. 23, 1997

[51] Int. Cl.[7] .................................................. G06F 12/08
[52] U.S. Cl. ........................... 711/132; 711/3; 711/156; 711/173; 707/206
[58] Field of Search ............................ 711/132, 144, 711/145, 3, 131, 156, 173; 707/206

[56] References Cited

U.S. PATENT DOCUMENTS

| | | | |
|---|---|---|---|
| 4,757,438 | 7/1988 | Thatte et al. | 711/6 |
| 4,907,151 | 3/1990 | Bartlett | 711/166 |
| 4,920,483 | 4/1990 | Pogue et al. | 711/219 |
| 5,043,870 | 8/1991 | Ditzel et al. | 711/132 |
| 5,045,995 | 9/1991 | Levinthal et al. | 712/236 |
| 5,097,407 | 3/1992 | Hino et al. | 712/209 |
| 5,107,457 | 4/1992 | Hayes et al. | 711/132 |
| 5,222,221 | 6/1993 | Houri et al. | 709/106 |
| 5,301,288 | 4/1994 | Newman et al. | 711/202 |
| 5,355,483 | 10/1994 | Serlet | 711/154 |
| 5,408,650 | 4/1995 | Arsenault | 395/704 |
| 5,535,329 | 7/1996 | Hastings | 714/35 |
| 5,560,003 | 9/1996 | Nilsen et al. | 711/206 |
| 5,561,786 | 10/1996 | Morse | 711/170 |
| 5,566,321 | 10/1996 | Pase et al. | 711/153 |
| 5,636,362 | 6/1997 | Stone et al. | 711/129 |
| 5,813,031 | 9/1998 | Chou et al. | 711/122 |
| 5,864,687 | 1/1999 | Baker et al. | 395/309 |

FOREIGN PATENT DOCUMENTS

0113460A2  7/1984  European Pat. Off. .

OTHER PUBLICATIONS

Krasner, Glenn, "The Smalltalk–80 Virtual Machine", Byte Publications, Inc., Aug. 1991; pp. 300–320.

Wilson, P.R., et al., "Design of the Opportunistic Garbage Collector", Proceedings of the Object Oriented Programming Systems Languages An Applications Conference, New Orleans, vol. 24, No. 10, Oct. 1989.

Dynamic Storage Allocation: A Survey and Critical Review, by Paul R. Wilson et al., date unknown, pp. 1–78.

Compliers, Principles, Techniques, and Tools, by Alfred V. Aho et al., 1985, pp. i–x, chapter 10, pp. 585–607.

Garbage Collection, Algorithms for Automatic Dynamic Memory Management, by Richard Jones et al., 1996.

Object Oriented Design with Applications, by Grady Booch, 1991.

A Fast Write Barrier for Generational Garbage Collectors, by Urs Holzle et al., Oct. 1993, pp. 1–6.

GC–FAQ—draft, http://www.centerline.com/people/chase/GC/GC–faq.html, 29 pages, Jan. 6, 1997.

An Introduction to the Win32 API, by Richard Hale Shaw, PC Magazine, vol. 13, No. 8, pp. 291–295, Apr. 26, 1994.

(List continued on next page.)

Primary Examiner—Hiep T. Nguyen
Attorney, Agent, or Firm—Kudirka & Jobse, LLP

[57] ABSTRACT

In computer systems which do not inherently distinguish between references and primitive values within a program stack a method and apparatus to assist exact garbage collection techniques utilizes a stack tag cache which operates in conjunction with a program stack and supplies a tag item for every entry in the process stack. The value of a tag item indicates whether the stack entry is either a reference to another memory location or a primitive value, i.e. integer or floating point number. The arrangements and values of the tag items are correlated with changes to the program stack. The stack tag cache includes facilities for swapping the contents of the cache in the event of a trap or context switch, as well as means for redundantly verifying the tag value with intended instruction operand types.

31 Claims, 6 Drawing Sheets

OTHER PUBLICATIONS

If Memory Serves, by Rick Grehan, pp. 279–337, Aug. 1989.

Virtually Virtual Memory, by Rick Grehan, pp. 455–464, Sep. 1990.

Evaluation of Parallel Copying Garbage Collection on a Shared–Memory Multiprocessor, by Akira Imai et al., IEEE Transactions on Parallel and Distributed Systems, vol. 4, No. 9, pp. 1030–1040, Sep. 1993.

Garbage Collection for Prolog Based on WAM, by Karen Appleby et al., Communications of the ACM, vol. 31, Issue 6, pp. 1–20, Jun. 1, 1988.

HeapGuard, Eliminating Garbage Collection in Real–Time Ada Systems, pp. 704–708.

Windows' Invisible Wall: The 64k Barrier, by Ed Bott, Windows Exam, pp. 210 and 212, Mar. 1994.

On Multi–Threaded List–Processing and Garbage Collection, by Wolfgang W. Kuechlin et al., pp. 894–897, 1991.

David Vinayak Wallace & Michael Tiemann, Simple Garbage Collection in G++, *Cygnus Support*, Revision 1.1, cov. and pp. 1–4.

Alejandro Caro, A Novel 64 Bit Data Representation for Garbage Collection and Synchronizing Memory, Computation Structures Group Memo 396, Apr. 9, 1997, Laboratory for Computer Science—MIT, cov. and pp. 1–4.

Robert Courts, Improving Locality of Reference in a Garbage–Collecting Memory Management System, Research Contributions, Artificial Intelligence and Language Processing, *Communication of the ACM*, Sep. 1988, vol. 31, No. 9, pp. 1128–1138.

David A. Moon, Garbage Collection in a Large Lisp System, 1984 ACM 0–89791–142–3/84/008/0235, pp. 235–246.

David A. Barrett, Improving the Performance of Conservative Generational Garbage Collection, Sep. 1995, University of Colorado at Boulder Technical Report CU–CS–784–95.

Chung, Kin–Man and Yuen, Herbert, "A 'Tiny' Pascal Compiler: the P–Code Interpreter," Byte Publications, Inc., Sep. 1978.

Chung, Kin–Man and Yuen, Herbert, "A 'Tiny' Pascal Compiler: Part 2: The P–Compiler," Byte Publications, Inc., Oct. 1978.

Thompson, Ken, "Regular Expression Search Algorithm, "Communications of the ACM, vol. II, No. 6, p. 149 et seq., Jun. 19658.

Mitchell, James G., Maybury, William, and Sweet, Richard, Mesa Language Manual, Xerox Corporation.

McDaniel, Gene, "An Analysis of a Mesa Instruction Set," Xerox Corporation, May 1982.

Pier, Kenneth A., "A Retrospective on the Dorado, A High--Performance Personal Computer," IEEE Conference Proceedings, The 10th Annual International Symposium on Computer Architecture, 1983.

If Memory Serves, Hands On Some Assembly Required, by Rick Grehan, Aug. 1989, pp. 279, 280, 282, 284 and 286.

Virtually Virtual Memory, Hands On Some Assembly Required, by Rick Grehan, Sep. 1990, pp. 455, 456, 458, 460, 462 and 464.

Evaluation of Parallel Copying Garbage Collection on a Shared–Memory Multiprocessor, by Akira Imai et al., IEEE Transactions on Parallel and Distributed Systems, vol. 4, No. 9, Sep. 1993, pp. 1030–1040.

On Multi–Threaded List–Processing and Garbage Collection, by Wolfgang W. Kuechlin et al., Department of Computer and Information Science, The Ohio State University, Jan. 1991, pp. 894–897.

HeapGuard™, Eliminating Garbage Collection in Real--Time Ada Systems, Sam Harbaugh et al., Integrated Software, Inc., pp. 704–708.

Windows, Windows' Invisible Wall: The 64K Barrier, by Ed Bott, Mar. 1994, pp. 210–212.

Garbage Collection for Prolog Based on WAM, Communications of the ACM, vol. 31, issue 6, by Karen et al., Dec. 4, 1996, pp. 1–20.

Diwan, A., et al. "Compiler Support For Garbage Collection in a Statically Typed Language," ACM Sigplan Notices, vol. 27, No. 7, Jul. 1, 1992, pp. 273–282.

Wiseman S.R. et al.: "Holisitc Computing" Microprocessors and Microsystems, vol. 19, No. 5, Jun. 1, 1995, pp. 261–267.

Tarditi D. et al.: "Til: A Type–Directed Optimizing Compiler for ML" ACM Sigplan Notices, vol. 31, No. 5, May 1, 1996, pp. 181–192.

Diwan A. et al.: "Compiler Support for Garbage Collection in a Statically Typed Language" ACM Sigplan Notices, vol. 27, No. 7, Jul. 1, 1992, pp. 273–282.

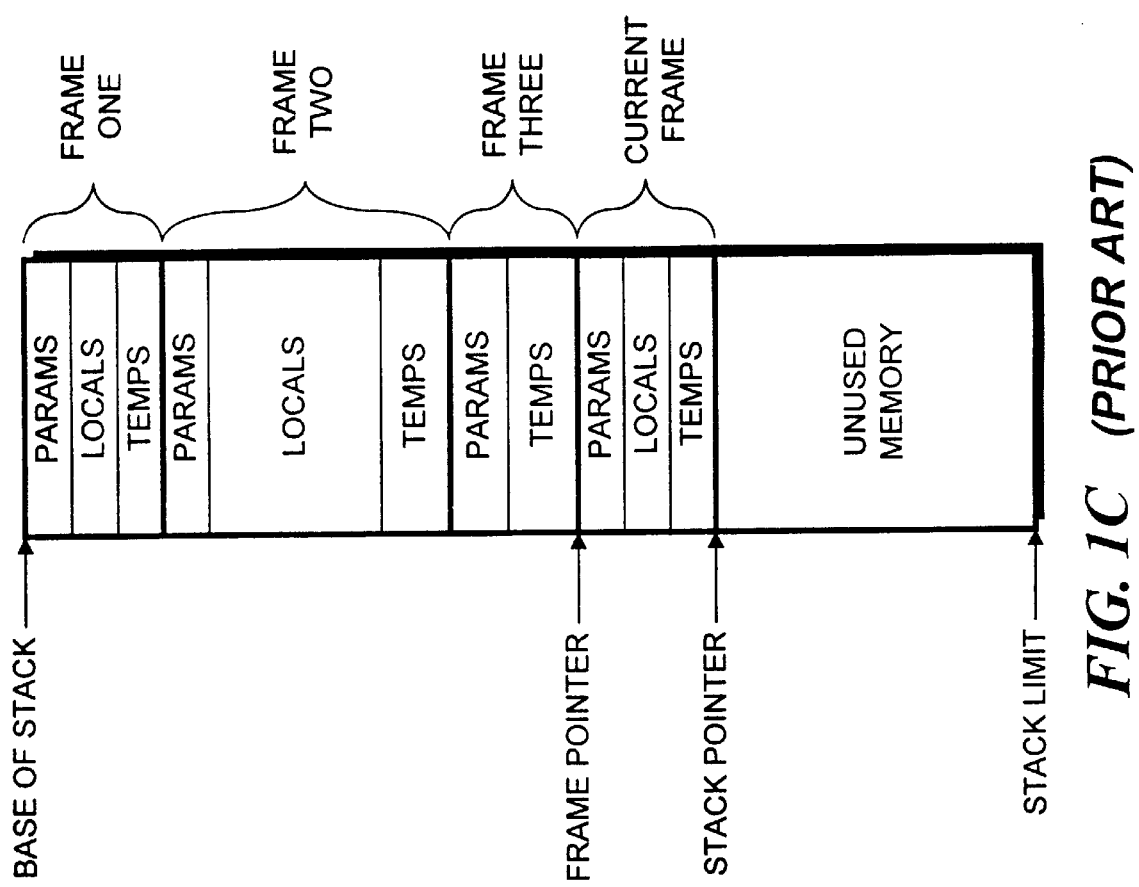
FIG. 1C *(PRIOR ART)*
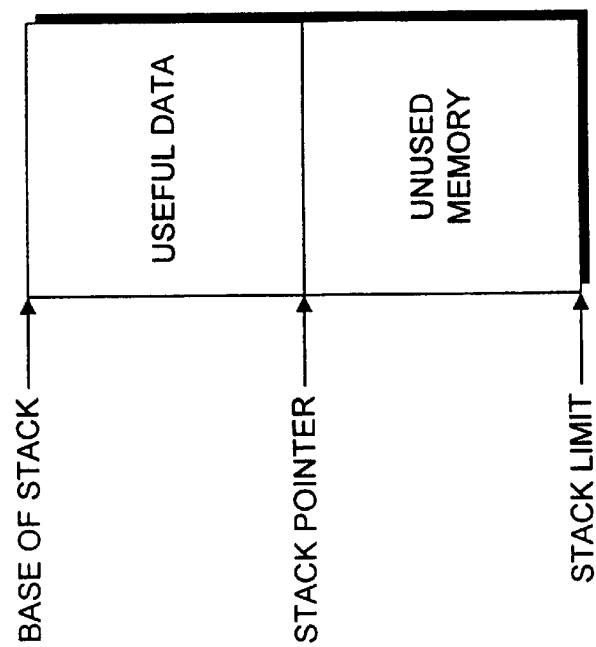
FIG. 1B *(PRIOR ART)*

APPARATUS AND METHOD FOR ASSISTING EXACT GARBAGE COLLECTION BY USING A STACK CACHE OF TAG BITS

CROSS REFERENCES TO RELATED APPLICATIONS

This application is the one of three patent applications filed on an even date herewith and commonly assigned, including U.S. patent application Ser. No. 08/847,770, now U.S. Pat. No. 5,909,579, entitled "METHOD AND APPARATUS FOR DELTA ENCODING LIVE POINTER MASKS FOR PROGRAM DATA STACKS", inventors: Ole Agesen and David Ungar, and U.S. patent application Ser. No. 08/842,063, now U.S. Pat. No. 5,903,899, entitled "SYSTEM AND METHOD FOR ASSISTING EXACT GARBAGE COLLECTION BY SEGREGATING THE CONTENTS OF A STACK INTO SUB STACKS", inventor: Guy L. Steele, Jr. The subject matter of the above-identified copending patent applications is hereby incorporated by reference.

FIELD OF THE INVENTION

The present invention relates to data processing systems, and, more specifically, to apparatus and methods for assisting with memory management.

BACKGROUND OF THE INVENTION

One of the most important resources within a data processing system is the amount of memory directly available for utilization by tasks during execution. Accordingly, much interest has been directed to efficient utilization of memory and memory management strategies. An important concept in memory management is the manner in which memory is allocated to a task, deallocated and then reclaimed.

Memory deallocation and reclamation may be explicit and controlled by an executing program, or may be carried out by another special purpose program which locates and reclaims memory which is unused, but has not been explicitly deallocated. "Garbage collection" is the term used in technical literature and the relevant arts to refer to a class of algorithms utilized to carry out storage management, specifically automatic memory reclamation. There are many known garbage collection algorithms, including reference counting, mark-sweep, and generational garbage collection algorithms. These, and other garbage collection techniques, are described in detail in a book entitled "Garbage Collection, Algorithms For Automatic Dynamic Memory Management" by Richard Jones and Raphael Lins, John Wiley & Sons, 1996. Unfortunately, many of the described techniques for garbage collection have specific requirements which cause implementation problems, as described herein.

For the purpose of this specification, the term "object" refers to a data structure that is represented in the memory of a computing system. This usage of the term object is distinct from the usage of the term "object" in "object-oriented" systems, wherein objects have associated "methods", i.e. pieces of code associated with them, which code may be invoked through a reference to the object. However, the present invention is applicable to such object-oriented systems.

An object may be located by a "reference", or a small amount of information that can be used to access the data structure. One way to implement a reference is by means of a "pointer" or "machine address", which uses multiple bits of information, however, other implementations are possible. General-purpose programming languages and other programmed systems often use references to locate and access objects. Such objects can themselves contain references to data, such as integers or floating-point numbers and to yet other objects. In this manner, a chain of references can be created, each reference pointing to an object which, in turn, points to another object.

Garbage collection techniques determine when a data structure is no longer reachable by an executing program, either directly or through a chain of pointers. When a data structure is no longer reachable, the memory that the data structure occupies can be reclaimed and reused even if it has not been explicitly deallocated by the program. To be effective, garbage collection techniques should be able to, first, identify references that are directly accessible to the executing program, and, second, given a reference to an object, identify references contained within that object, thereby allowing the garbage collector to trace transitively chains of references.

A subclass of garbage collectors known as "relocating" garbage collectors, relocate data structures that are still reachable by the executing program. Relocation of a data structure is accomplished by making a copy of the data structure in another region of memory, then replacing all reachable references to the original data structure with references to the new copy. The memory occupied by the original data structure may then be reclaimed and reused. Relocating garbage collectors have the desirable property that they compact the memory used by the executing program and thereby reduce memory fragmentation.

Because relocating garbage collectors modify references during the garbage collection process, it is important that references be identified and distinguished from non-reference information, such as data, which cannot be modified for garbage collection purposes. Consequently, fully relocating garbage collectors belong to a subclass of garbage collection methods, known as "exact" garbage collectors, which require knowledge whether a given piece of information in memory is a reference or a primitive value. For the purposes of this document, a "primitive value" or "primitive data" is defined as data which does not function as a reference, such as an integer or floating point number.

In order to facilitate the use of exact garbage collection, some computing systems use a "tagged" representation for all memory locations to positively distinguish references from data. In such systems, references and primitive data, such as integers and floating-point numbers, are represented in memory in a manner that a reference always has a different bit pattern than a primitive value. This is generally done by including tag bits in each memory location in addition to the bits holding the memory location value. The tag bits for a memory location holding a reference value are always different from the tag bits for a memory location holding a datum value. The MIT LISP Machine was one of the first architectures which used garbage collection and had a single stack with explicitly tagged memory values. Its successor, the Symbolics 3600, commercially available from Symbolics, Inc., Cambridge, Mass., also used explicitly tagged memory values. The Symbolics 3600 was able to accommodate either a 32-bit reference or a 32-bit primitive datum in a single stack by using 36 bit words, 4 bits of which were permanently allocated for tagging information. As such, the bit pattern within a 36-bit word for a reference was always distinguishable from the bit pattern for a primitive integer or floating-point value.

Permanently allocated tag bits have the disadvantage that they consume memory space that might otherwise be used to store computational data. Consequently, many computer systems use an "untagged" data representation in which the entire memory word is devoted to representing the datum value. In such systems, the same bit pattern might represent a reference or a primitive value. As a result, in such systems, the distinction between references and primitive values is often made from external considerations or representations, such as the instruction that is to operate on the data, or the position of the data within an object. However, the use of external considerations to make this distinction was not possible in all systems.

For example, the Java programming language was originally designed for use in systems using untagged data representation. The Java programming language is described in detail in the text entitled "The Java Language Specification" by James Gosling, Bill Joy and Guy Steele, Addison-Wesley, 1996. The Java language was designed to run on computing systems with characteristics that are specified by the Java Virtual Machine Specification which is described in detail in a text entitled "The Java Virtual Machine Specification", by Tim Lindholm and Frank Yellin, Addison-Wesley, 1996.

According to the Java Virtual Machine (JVM) Specification, a local variable or stack slot in a computing system using 32-bit memory words may contain either a 32-bit integer, a 32-bit floating-point number, or a 32-bit reference. Consequently, tagged data representation cannot be used in all cases (programming languages that use tagged data representation on 32-bit computer architectures typically restrict the size of integers to 30 bits.) However, it is not possible to distinguish references from data in all cases by examining Java instructions, because many instructions operate indiscriminately on references and data.

Consequently, for garbage collection purposes, there is a need to distinguish references and data in systems which do not allow tagged data representation and which do not have an instruction set that allows references and data to be distinguished in all cases.

SUMMARY OF THE INVENTION

In accordance with the principles of the invention, reference values are distinguished from data values by associating tag information with each data item that appears on the program stack. The tag information is stored in a memory area separate from the memory area in which the stack is located. During program operation, tag information is associated with each stack item and can be used to distinguish reference values from primitive data values.

In accordance with one embodiment, the association is performed by using a small hardware stack tag cache memory which is loaded from the tag information memory area and stores tag information for at least some of the data items found on the stack. A reference value on the stack can then be distinguished from a primitive datum value by retrieving tag information from the cache memory and examining the tag information associated with a stack item.

One aspect of the invention contemplates the use of a stack tag cache mechanism which includes a cache memory that stores one extra bit for each of a set of multi-bit items in the program stack. Whenever the processor accesses a multi-bit word on the stack, the inventive stack tag cache mechanism examines the memory address of the stack word and takes one of two actions. If the memory address indicates that the stack word is within the item set for which tag information is stored in the cache memory, the mechanism supplies the current value of the extra bit associated with the stack item, thereby allowing distinction as to whether the stack item is a reference or a primitive value. The mechanism may also allow the cache memory to be updated at this time. Alternatively, the cache mechanism may signal to the processor to cause the processor to generate a trap condition indicating that the memory address of the stack item is not in the set for which tag information is stored. In response, the processor can retrieve the associated tag information from the selected memory locations in main memory and store the tag information within the stack tag cache memory.

In accordance with another aspect, the stack tag cache mechanism of the present invention further provides data paths for loading and storing the contents of the tag cache memory with multiple bit words, thereby facilitating trap handling as well as expediting saving and restoring the contents of the tag cache memory during a context switch between multiple threads of control.

According to still another aspect of the present invention, a stack tag cache for use with a computer system having a program stack of data entries, comprises an addressable memory configured to store a plurality of tag items, each tag item associated with a data entry having a value identifying whether the associated data entry contains a reference or a primitive value. The stack tag cache further comprises comparative logic configured to determine whether a tag item associated with a stack entry is resident within the addressable memory and output logic, responsive to an address supplied to the addressable memory, configured to present the value of the tag item selected by the address. Logic configured to write the value of a tag bit not stored within the addressable memory, and logic to enable simultaneous addressing and presentation of at least two tag items values may also be included.

In accordance with a further aspect of the present invention, a method for determining whether data located within a stack entry stored in a first memory area is a reference or a primitive value comprises the steps of maintaining a plurality of tag items in a second memory area, each tag item associated with a stack entry, retrieving one of the tag items which corresponds to a selected stack entry and determining from the value of the retrieved tag item whether the data contained within the corresponding stack entry is a reference or a primitive value.

In accordance with yet another aspect of the present invention, a computer system having a processor and a memory further comprises a stack tag cache, responsive to the processor and configured to store a plurality of tag items. Each tag item is associated with the data in a stack entry and has a value indicating whether the data contained within the stack entry is a reference or a primitive value. The stack tag cache further comprises logic configured to determine whether a retrieved tag item corresponding to a selected stack entry is resident within the cache and logic, responsive to memory addresses, configured to present at a cache output, the value of the tag item selected by the address applied to the stack tag cache.

In accordance with a further aspect of the invention, a computer program product for use with a computer system having a processor and a memory comprises a computer usable memory having computer program code embodied therein, the program code comprising program code for maintaining a plurality of tag items in memory, each tag item associated with data in a stack entry, program code for retrieving one of the plurality of tag items which corresponds to a selected stack entry, and program code, responsive to a memory address, for presenting the value of a tag item associated with the selected stack entry.

BRIEF DESCRIPTION OF THE DRAWINGS

The above and other features, objects and advantages of the invention will be better understood by referring to the following description in conjunction with the accompanying drawing in which:

FIG. 1B is a conceptual illustration of a conventional program data stack;

FIG. 1C is a conceptual illustration of a program stack, including frames, suitable for use with the present invention;

DESCRIPTION OF THE PREFERRED EMBODIMENT

The present invention provides a method and apparatus which addresses the requirements of exact garbage collection algorithms. Specifically, the invention addresses the requirement of distinguishing references from nonreferences within a data stack where untagged data representations are nominally used with a computer architecture whose structure encourages the use of data representation such that references and primitive values are the same size.

Although the illustrative embodiments are described with reference to a computer system implementing the Java programming language and Java Virtual Machine specifications, the invention is equally applicable to other computer systems having similar requirements. Specifically, the invention may be implemented with both object oriented and non-object oriented programming systems. Further, the invention may be implemented with systems having single threads and single program stacks as well as with multi-threaded systems, having multiple simultaneous program stacks. Prior to describing the invention in detail, descriptions of a computer system suitable for use with the present invention, a program stack structure, and programming instructions complying with the Java Virtual Machine environment are provided for the reader's benefit.

Computer System and Program Stack Architecture

Figure 1A:
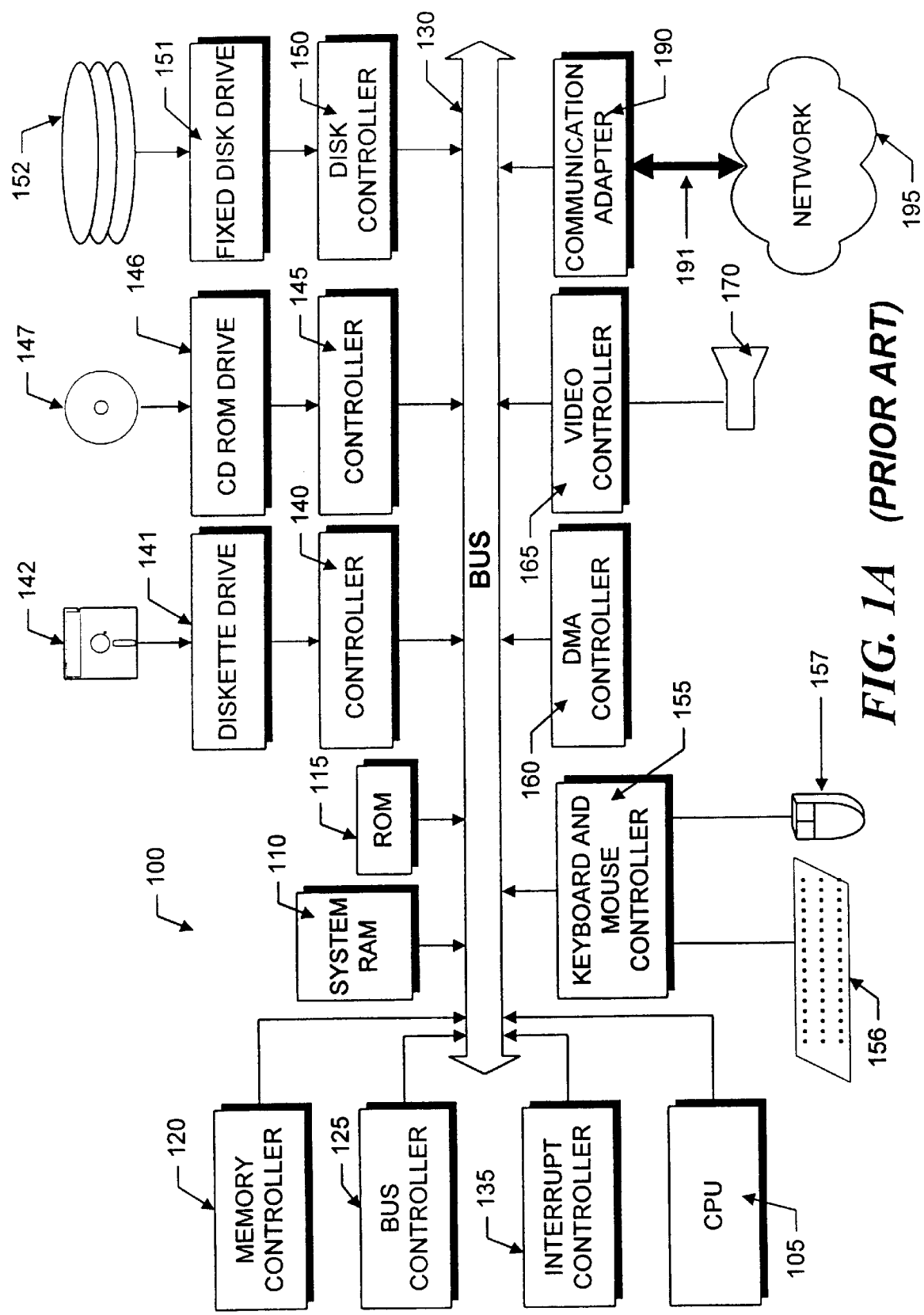
FIG. 1A is a schematic block diagram illustrating a computer architecture suitable for use with the present invention.

FIG. 1A illustrates the system architecture for a computer system with which the invention may be implemented. The exemplary computer system of FIG. 1A is for descriptive purposes only. Although the description may refer to terms commonly used in describing particular computer systems, such as in IBM PS/2 personal computer, the description and concepts equally apply to other computer systems such as network computers, workstation and even mainframe computers having architectures dissimilar to FIG. 1A.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, which may be single or multiple threaded. The operating system controls allocation of system resources and performs tasks such as processing scheduling, memory management, networking, and I/O services, among other things.

In conventional computing systems, an ongoing computation uses a "stack" to support procedure calls and to hold intermediate computational quantities such as references, and primitive values. A stack comprises an unused portion of internal memory which reduces the number of registers needed for temporary storage and decreases the number of steps needed in a program, while facilitating push-down type storage. FIG. 1B illustrates conceptually the structure of a conventional program stack residing in system memory. Three important positions in memory define the stack: the stack base, the stack pointer, i.e., the current stack top, and the stack limit. Typically, these positions are identified by memory addresses kept in three machine registers.

When a datum is to be pushed onto the stack, it is stored into the unused memory location nearest the stack pointer. The stack pointer is then advanced toward the stack limit. If the stack pointer is too close to the stack limit, the stack is said to "overflow" and some special action must be taken, e.g. signal an error or allocate more memory to hold the stack.

When a datum is to be popped from the stack, the stack pointer recedes toward the stack base, causing the memory that holds the datum to become regarded as unused memory again. If the stack pointer is too close to the stack base, the stack is said to "underflow" and some special action must be taken, e.g. signal an error or switch to another region of memory that holds more stack data. Depending on the implementation, the stack base may reside at either a higher memory address than the stack limit.

In the Java programming language, data on the stack is grouped into "frames", as illustrated in FIG. 1C. Each frame corresponds to one level of subroutine invocation or method invocation. Every frame is divided into three regions: parameters, local variables, and evaluation temporaries. Parameters are closest to the stack base while the evaluation temporaries are furthest from the stack base. Each of these three regions may be empty, depending on the particular subroutine to be executed with that frame. As a subroutine executes, the number of evaluation temporaries may vary as items are pushed onto or popped from the stack, however, the number of parameters and local variables typically does not vary. Consequently, different frames may have different sizes.

To simplify addressing of parameters and local variables, an additional address, the "frame pointer", typically kept in a machine register, indicates start of the parameter area in the current stack frame. Instructions can then access a parameter or local variable in the current frame by specifying an offset from the current frame pointer.

When a subroutine or method is to be invoked, some items at the top of the evaluation stack become parameters within the new frame. The current frame pointer is saved on the stack along with the program counter. The frame pointer is then loaded with the address of the new frame while the program counter is loaded with the address of the code for the subroutine.

Some computing systems are "multi-threaded" in which multiple ongoing computational processes share a single address space or a single pool of objects. Such a set of processes typically has more than one stack or one stack for each process. Such multiple processes can be served by a single storage management strategy.

Java Programming Instructions

In a computer system that supports the Java programming language, many of the instructions that operate on the stack specify whether the data is to be reference data or primitive data. For example, the "iadd" instruction pops two operands from the stack, which must be integers. Their sum is then pushed back onto the stack as an integer. Similarly, the "aaload" instruction pops two items from the stack, which must be a reference to an array of references and an integer index. The instruction selects a reference from the array as indicated by the index value and then pushes a copy of the selected reference onto the stack.

Conversely, some instructions of the Java Virtual Machine do not specify whether their operands operate on references or primitive data, and are expected to work on either kind of data indiscriminately. For example, the "pop" instruction pops one item from the stack and may be used to discard either a reference or a 32-bit primitive value. The "dup" instruction pushes a copy of the item on the top of the stack and can be used to duplicate a reference or a 32-bit primitive value. The "dup2" instruction may be used to duplicate one 64-bit primitive value, two 32-bit primitive values, two references, or one reference and one 32-bit primitive value, in either order.

The complete list of Java Virtual Machine instructions that allow such "indiscriminate" use is as follows: In every instruction description:

Let x1 mean the item that is topmost on the stack when the instruction begins execution.

Let x2 mean the mean item that is second from the top on the stack when the instruction begins execution.

Let x3 mean the item that it third from the top on the stack.

Let x4 mean the when the item that is fourth from the top on the reference stack when the instruction begins execution.

Pop
   Pop x1 from the stack and discard.
Pop 2
   Pop x1 from the stack and discard, then pop x2 from the stack and discard.
dup
   Push a copy of x1 onto the stack.
dup2
   Push a copy of x2 onto the stack, then push a copy of x1 onto the stack.
dup_x1
   Pop x1 from the stack, then
   Pop x2 from the stack, then
   push a copy of x1 onto the stack, then
   push a copy of x2 onto the stack, then
   push another copy of x1 onto the stack.
dup_x2
   Pop x1 from the stack, then
   pop x2 from the stack, then
   pop x3 from the stack, then
   push a copy of x1 onto the stack, then
   push a copy of x2 onto the stack, then
   push another copy of x1 onto the stack.
dup2_x1
   Pop x1 from the stack, then
   pop x2 from the stack, then
   pop x3 from the stack, then
   push a copy of x2 onto the stack, then
   push a copy of x1 onto the stack, then
   push a copy of x3 onto the stack, then
   push another copy of x2 onto the stack, then
   push another copy of x1 onto the stack.
dup2_x2
   Pop x1 from the stack, then
   pop x2 from the stack, then
   pop x3 from the stack, then
   pop x4 from the stack, then
   push a copy of x2 onto the stack, then
   push a copy of x1 onto the stack, then
   push a copy of x4 onto the stack, then
   push a copy of x3 onto the stack, then
   push another copy of x2 onto the stack, then
   push another copy of x1 onto the stack.
swap
   Pop x1 from the stack, then
   pop x2 from the stack, then
   push a copy of x1 onto the stack, then
   push a copy of x2 onto the stack.

In many implementations of the Java Virtual Machine, the actual implementation of instructions may be optimized to reduce the amount of work. For example, the "swap" operation may read the top two stack items and then write each value into the other stack slot, without actually performing any adjustments of the stack pointer.

In addition, some implementations of the Java Virtual Machine use so-called "quick" instructions. Quick instructions are additional instruction codes that are not valid in Java compiled programs as transmitted across the Internet. However, the JVM implementation will sometimes process certain slow instructions that require resolution of symbolic links, such as to the name of a field defined in another class, by resolving the link the first time the instruction is executed, then replacing the instruction with a faster "quick" variant. Sometimes such a quick variant is used to handle both references and primitive data. Such quick instructions include the following:

getfield_quick
   getfield_quick_w
   getstatic_quick
   ldc_quick
   ldc_w_quick
   putfiled_quick$_{13}$ w
   putstatic_quick These quick instructions are "indiscriminate" and may be used on reference data or on primitive data. Quick instructions are substituted for slower instructions that are not indiscriminate. Unfortunately, the information associated with the slower instruction, or its operand, that indicates whether that particular instruction will always transfer a reference or datum, is lost when the slower instruction is replaced by an indiscriminate, pre-resolved, but otherwise equivalent quick instruction.

Implementations of the Java Virtual Machine include a process referred to as the "verifier", one of the purposes of which is to examine the code of every method as it is loaded to ensure that the instruction sequence obeys certain constraints. Specifically, the verifier ensures, in a static manner, before the code is executed, that whenever an instruction expects an item on the stack to be a reference, the item will be a reference on every execution of that particular instruction, and, that whenever an instruction expects an item on the stack to be primitive data, the item will be primitive data on every execution of that particular instruction.

As part of the verification process, for any particular occurrence of a standard (non-quick) JVM instruction that allows indiscriminate use, i.e., any of the pop, pop2, dup, dup2, dup_x1, dup_x2, dup2_x1, dup2_x2, or swap instructions, the verifier can determine that any particular stack operand of that instruction either will always be a reference or will never be a reference.

The Java virtual machine provides the following bytecode instructions that operate on local variables that are accessed through addresses calculated relative to the base of a frame, whose address is typically kept in a frame pointer register:

| iload  | iload_0  | iload_1  | iload_2  | iload_3  |
| fload  | fload_0  | fload_1  | fload_2  | fload_3  |
| lload  | lload_0  | lload_1  | lload_2  | lload_3  |
| dload  | dload_0  | dload_1  | dload_2  | dload_3  |
| aload  | aload_0  | aload_1  | aload_2  | aload_3  |
| istore | istore_0 | istore_1 | istore_2 | istore_3 |
| fstore | fstore_0 | fstore_1 | fstore_2 | fstore_3 |
| lstore | lstore_0 | lstore_1 | lstore_2 | lstore_3 |
| dstore | dstore_0 | dstore_1 | dstore_2 | dstore_3 |
| astore | dstore_0 | dstore_1 | dstore_2 | astore_3 |

The bytecode instructions illustrated above whose names contain an underscore and an integer k access the local variable at offset k from the base of the frame. The other bytecode instructions allow a larger range of offsets by encoding the offset in one or more additional instruction bytes.

Those bytecode instructions illustrated above whose names contain "load" push a copy of the contents of a local variable onto the stack. Those bytecode instructions whose names contain "store" pop a value from the stack and store the popped data into a local variable. Those bytecode instructions whose names begin with "a" are used in conjunction with reference values. All other bytecode instructions are used in conjunction with primitive values i.e. integer, float, long, or double.

Stack Tag Cache

The present invention addresses the problem of discrimination between references and primitive values in a stack by effectively increasing the width of each stack word beyond that of a normal memory word, with the inclusion of additional tag bits for each stack word. The additional tag bits are stored in a pseudo stack manner which may be pushed, popped, examined, and updated in a correlated manner with the program stack containing the data. This second or pseudo stack may be implemented in hardware as a tag cache.

Figure 2:
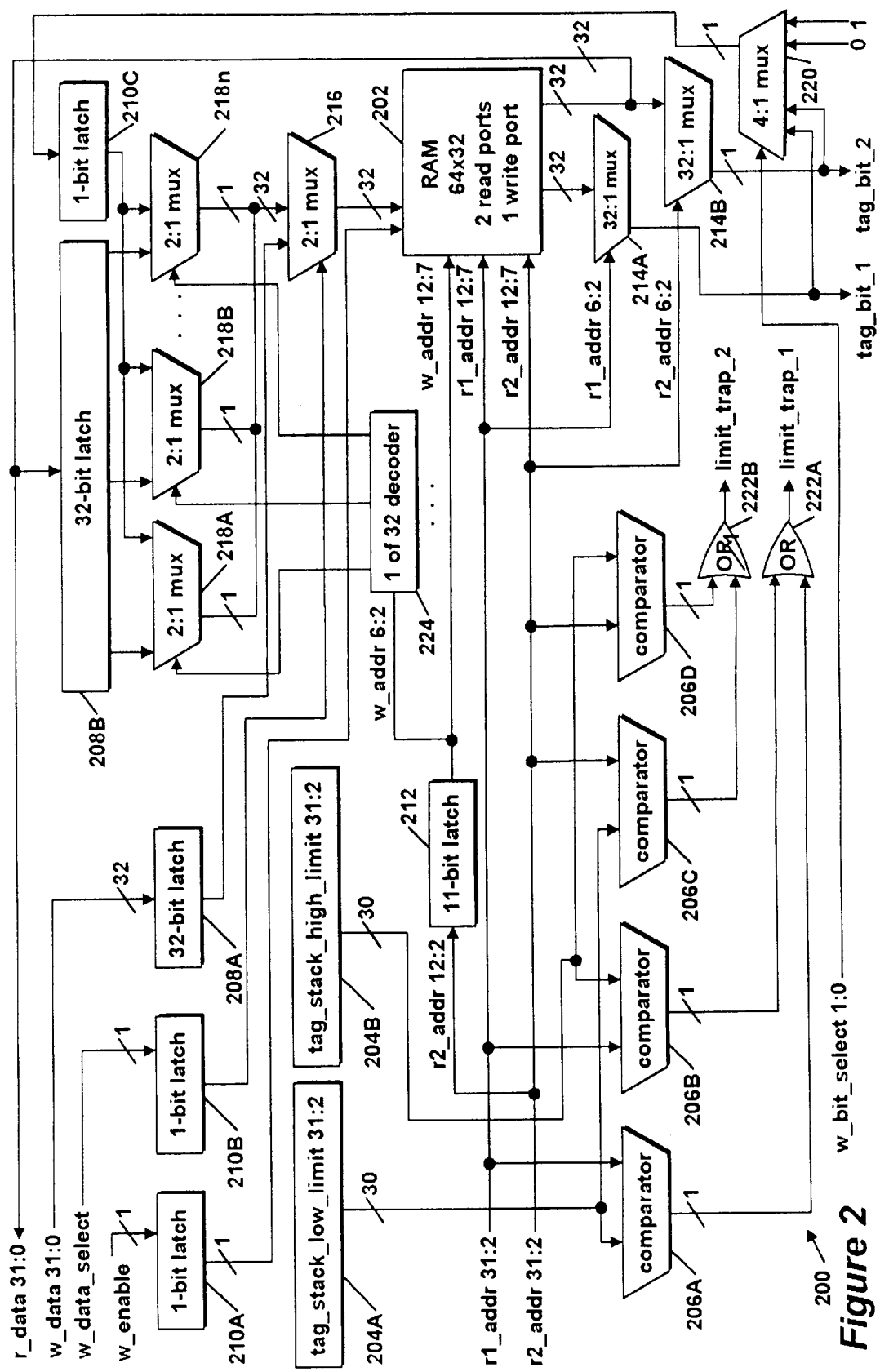
FIG. 2 is a schematic block diagram of a stack tag cache in accordance with a first embodiment of the present invention.

A stack tag cache 200, according to a first embodiment of the invention, is illustrated in FIG. 2. Stack tag 200 comprises a multiported Random-Access Memory (RAM) 202 and supporting logic 204–224. In the illustrative embodiment, RAM 202 may be 64×32 bits, have first and second read ports, one write port, and a "flow-through" capability, such that if the same word is both read and written on the same clock cycle, then the value read from RAM 202 is the same as the value being written to RAM 202 on that clock cycle.

A tag stack low limit register 204A and tag stack high limit register 204B, each 30-bits long, are used to store the low and high limits respectively of the tag stack. The central processor executes appropriate commands for reading and writing the contents of the tag stack limit registers in a manner understood by those reasonably skilled in the art.

Four 30-bit comparators 206A–D, each producing a 1-bit result, e.g. logical 1 if the first input (the left-hand input in FIG. 2) is greater than the second input (the right-hand input in FIG. 2) otherwise logical 0, are used to compare the high and low tag stack limits with the addresses supplied to the read ports of RAM 202. Specifically, the output of tag stack low limit register 204A is supplied to the first input of comparators 206A and 206C. The output of tag stack high limit register 204B is supplied to the second input of comparators 206B and 206D. A first memory address, r1_addr, is supplied to the second input of comparator 206A and the first input of comparator 206B. Similarly, a second memory address, r2_addr, is supplied to the second input of comparator 206C and the first input of comparator 206D. The outputs of comparators 206A and 206B are supplied to a 2-input OR gate 222A, the output of which, if logical 1, indicates a trap limit for the first memory address, r1_addr. Similarly, the outputs of comparators 206C and 206D are supplied to a 2-input OR gate 222B, the output of which, if logical 1, indicates a trap limit for the second memory address, r2_addr.

An 11-bit portion of the second read address (r2_addr 12:2) is supplied to an 11-bit latch 212. The 11-bit output of latch 212 is split into a 6-bit portion (w_addr 12:7), which is supplied to RAM 202 as a write address, and a 5-bit portion (w_addr 6:2), which is supplied to decoder 224. A first 1-bit 32-to-1 multiplexer 214A receives as its input, the 32-bit output of the first read port of RAM 202 and a 5-bit portion of the first read address (r1_addr 6:2) as a 5-bit select signal, as illustrated. A second 1-bit 32-to-1 multiplexer 214B receives as its input, the 32-bit output of the second read port of RAM 202 and a 5-bit portion of the second address (r2_addr 6:2) as a 5-bit select signal, as illustrated. 6-bit portions of the first and second read addresses (r1_addr 12:7, r2_addr 12:7) are similarly supplied to RAM 202, as illustrated. The 1-bit output of multiplexer 214A serves as the first tag bit, while the 1-bit output of the second multiplexer 214B serves as the second tag bit, both of which are readable by CPU 105. The 1-bit outputs of multiplexers 214A–B are also supplied to a 1-bit 4-to-1 multiplexer 220 which also receives, at inputs thereof, logical 0 and logical 1, as illustrated. Multiplexer 220 receives a 2-bit write bit select signal (w_bit_select 1:0) at the control inputs thereof, as illustrated.

A 32-bit latch 208A receives as its input, a 32-bit write data signal (w_data 31:0), as illustrated. The output of latch 208A is supplied to a 32-bit 2-to-1 multiplexer 216 at a first input thereof. The 32-bit output of multiplexer 216 is supplied to the write port of RAM 202, as illustrated. Multiplexer 216 is controlled by a 1-bit control signal received from a 1-bit latch 210B. The input to latch 210B is a 1-bit write data select signal (w_data_select), as illustrated. The output of latch 210A is supplied to RAM 202, as illustrated.

A second 32-bit latch 208B receives, as its input, the 32-bit output of the second read port of RAM 202 (r_data 31:0), as illustrated. The output of latch 208B is supplied at a first input of each of 32 1-bit to-1 multiplexers 218A-n, as illustrated. The second input of each multiplexer 218A-n is received from a 1 bit latch 210C, the input of which is received from the output of multiplexer 220, as illustrated. The outputs of each multiplexer 218A-n are supplied to the second 32-bit input of multiplexer 216, as illustrated. The control signal for each multiplexer 218 is supplied by one of the 32 output lines of decoder 224, as illustrated.

In the illustrative embodiment, the bits in a multibit signal are numbered in "little-endian" order. For example, a 32-bit signal may be described as bits 31:0 (31 through 0, inclusive) where bit 31 is the most significant bit and the bit 0 is the least significant bit when the multibit signal is to be regarded as a binary number.

The operation of stack tag cache 200 is set forth hereafter. It is assumed that, on every clock cycle, the CPU 105 will read at most two stack locations and write at most one stack location. Moreover, if the CPU 105 writes a stack location and also reads two stack locations, then one of the stack locations read must be the same as the stack location that is written.

On any given clock cycle, then, the CPU 105 presents to stack tag cache 200 the memory addresses, r1_addr and r2_addr, of two stack locations. These addresses are assumed to be byte addressed but should be word-aligned. Therefore, only bits 31:2 of the addresses need to be presented to stack tag cache 200. The address of a stack location to be written, or read and written, may be presented as r2_addr. The address r1_addr may be used for a stack location that is to be read but not written.

The two addresses are each compared to the contents of tag stack low limit register 204A and tag stack high limit register 204B. If either address is less than the low limit or greater than the high limit, then one of the four 30-bit comparators 206A–D having that address as an input will generate a logical 1 as an output, and the corresponding 2-input OR gate 222 will produce a logical 1 for its result, i.e. limit_trap_1 for r1_addr and limit_trap_2 for r2_addr. If either limit_trap_1 or limit_trap_2 is a logical 1, stack tag cache 200 cannot successfully complete its intended operation on this clock cycle. The CPU 105 then reacts by terminating execution of the current instruction and performing a trap so that a trap handler process can address the trap scenario, as discussed in greater detail hereinafter.

Portions of the two addresses r1_addr and r2_addr are also used to extract two tag bits from the RAM 202. For each address, six bits (bits 12:7) are used as the read address for one of the read ports of the RAM 202, causing one 32-bit word to be read out and supplied to one of 32-to-1 multiplexors 214A–B. Another five bits (bits 6:2) are used as the control selector for the same multiplexor, thereby selecting one bit. The two bits so selected are made available to the CPU 105 as the signals tag_bit_1, selected by r1_addr, and tag_bit_2, selected by r2_addr. As CPU 105 receives the two 32-bit words read from two data stack locations, the bits tag_bit_1 and tag_bit_2 may each be adjoined to the 32-bit data words by the CPU 105 to produce two 33-bit quantities. The value of the 33rd bit indicates whether the 32-bit stack item is a reference or a primitive value. In the preferred embodiment, a logical 1 as the 33rd bit indicates a reference, while a logical 0 as the 33rd bit indicates a primitive value.

In the illustrative embodiment, stack cache 200 provides one extra bit for every 32 bit stack item.

The entire 32-bit word read from RAM 202 as selected by r1_addr bits 12:7 is also made available to CPU 105 as r_data 31:0, thereby providing a path for quickly reading out one or more words from RAM 202.

On the same clock cycle, CPU 105 generates the appropriate signals for writing information into stack tag cache 200. Since the actual write operation occurs on the next clock cycle, the set of latches previously described is used to hold the data and control signals from the current clock cycle to the next clock cycle. The w_enable signal is a logical 1 if a word is to be written to RAM 202 and a logical 0 if no word is to be written.

The signals described below are relevant to a write operation. Once r2_addr bits 12:2 are latched in the 11-bit latch 212, bits 12:7 of r2_addr are used to address the location within RAM 202 where the 32-bit word may be written. Bits 6:2 of r2_addr are fed into the 1-of-32 decoder 2224. The 32 outputs of decoder 224 are used to control the 32 1-bit multiplexors 218A–N. Of these 32 control signals, exactly one will be a logical 1, the rest will be a logical 0.

CPU 105 supplies a 32-bit data word comprising the w_data signal.

If the w_data_select signal is a logical 1, then the 32-bit word supplied by CPU 105 as the w_data signal will be written to RAM 202. If the w_data_select signal is a logical 0, then the data to be written to RAM 202 is a 32-bit "update value" produced by the 32 1-bit multiplexors 218A-n. The word read from the RAM 202 location specified by r2_addr bits 12:7 is fed into latch 208B and a first input of each of the 32 multiplexors 218A-n, one bit into each multiplexor. An "update bit", the output of the 4-to-1 multiplexor 220, is fed into the second input of all 32 of the 2-to-1 multiplexors 218A-n. As a result, the "update value" is equal to r_data with exactly one of its bits replaced by the "update bit". In this manner in a read-modify-write strategy on 32-bit words, RAM 202 may be used as if it were addressable down to individual bits.

The value of the "update bit" is controlled by the 2-bit w_bit_select signal. If the w_bit_select has a binary value of 00, then the update bit is equal to tag_bit_1. If w_bit_select has a binary value of 01, the update bit is equal to tag_bit_2. If w_bit_select has a binary value of 10, then the update bit is equal to logical 0. Finally, if w_bit_select has a binary value of 11, the update bit is equal to logical 1.

CPU 105 may use the limit_trap_1 signal and limit_trap_2 signal on any given clock cycle to gate the w_enable signal on the same clock cycle. In this manner, if a trap occurs, writing to RAM 202 is suppressed.

In the illustrative embodiment, if CPU 105 is implemented with a microprocessor, the stack tag cache hardware described herein may be implemented within the same integrated circuit package as the microprocessor. Stack tag cache 200 may be utilized in conjunction with a hardware stack data cache which contains items at or near the top of the stack. The construction and operation of such a hardware stack data cache is within the scope of those skilled in the relevant arts. The number of entries of the stack tag cache may be equal to or different from the number of entries in the stack data cache.

In an alternative embodiment, the stack data cache, as well as the stack tag cache may reside in system memory. The implementation of such a software stack tag cache will be within the scope of those reasonably skilled in the arts in light of the foregoing description of stack tag cache 200 and the remaining description within this document.

From the foregoing description, the reader will appreciate that the invention provides a method and apparatus in which tagged representations are used for references and primitive values stored in the stack, while untagged representations are used for references and primitive values within objects in the heap. The tag bits associated with the stack words are automatically updated by CPU 105 as it executes instructions that push items onto the stack or updates locations already within the active region of the stack.

It is contemplated in the present invention that the data stack may not always occupy a contiguous region of memory. Instead, the data stack may be allocated an initial quantity of contiguous memory. If the stack overflows, additional regions of contiguous memory may be allocated. Two or more such contiguous regions representing a single stack may be chained into a list. Current stack underflow will cause the current stack region to be abandoned, later to be recycled. The stack pointer and the frame pointer are adjusted to reference the preceding region in the list. Whenever a new contiguous region of memory is allocated for the stack, the region must be large enough to hold at least a frame that is about to be pushed onto the stack.

When CPU 105 makes a context switch from one thread of execution to another, the CPU typically saves the current contents of the stack pointer register, frame pointer register, stack data limit registers, and the stack data into main memory. CPU 105 then loads new values into the stack pointer, frame pointer, and stack limit registers. In accordance with the present invention, CPU 105 also saves the contents of tag stack limit registers 204A–B, and RAM 202 into main memory. CPU 105 then loads new values into limit registers 204A–B.

The design of stack tag cache 200 facilitates saving the contents of RAM 202. Specifically, CPU 105 can read 32 bits at a time from RAM 202 by presenting an address as r2_addr and reading the data as the 32-bit signal (r_data 31:0). CPU 105 can write 32 bits at a time into RAM 202 by presenting an address as r2_addr, a value of logical 1 for w_enable and w_data_select, and 32 bits of data (w_data 31:1). The ability to read and write 32 bits of the RAM at a time facilitates rapid handling of traps while minimizing the frequency of traps and allowing rapid context switching.

The amount of main memory 110 needed to hold the tag bits can be allocated at the time of a trap or context switch, and may be located near the memory used to hold the stack data. In a typical implementation of the Java Virtual Machine, program stacks are allocated in chunks. A chunk may contain 5 words of bookkeeping information and 2000 words of actual stack data, the number 2000 being arbitrary. In the preferred embodiment of the invention, stacks may be allocated in chunks of 2 kilowords (2048 words). Five of these words may be used for bookkeeping information, 62 words may be reserved to hold stack tag bits (providing 1984 tag bits), and 1981 words may be used to hold actual stack data. Note that three of the tag bits are unused. With this implementation, it is always possible for all the tag bits for a stack frame to fit into a stack tag cache RAM of 2048 bits. It will be obvious to those skilled in the arts that the actual size of memory allocated for the stack size may vary according to design requirements. For example, the invention may be implemented with a RAM of 32×32 bits and a main memory stack chunk size of 4096 words or both. However, in such embodiments, it is not always possible for all tag bits for a stack frame to fit into the stack tag cache RAM.

When a trap occurs because the address of the selected stack entry falls outside of the predetermined limits indicating that the desired tag item is not in the stack tag cache 200, the trap handling procedure will include copying tag information from main memory into the cache memory. The entire cache may be replaced or a portion of the cache may be replaced depending on the particular system. Restoration of the stack tag cache memory 200 occasioned by a cache "miss" is within the scope of those reasonably skilled in the arts in light of the foregoing description of stack tag cache 200 and the remaining description within this document. In any case, a minimum amount of information including the desired tag entry must be retrieved from the main memory and stored in the cache memory.

It will be appreciated from the foregoing description of the present invention that a single stack may be represented as in two coordinated stacks that may grow and shrink together. Whenever a 32-bit item is logically pushed onto the data stack, a 1-bit tag may be logically pushed onto the stack tag cache. Whenever a 32-bit item is fetched or updated within the data stack, a corresponding 1-bit tag may be fetched or updated within the stack tag cache.

Stack Tag Cache Alternative Implementation

Figure 3:
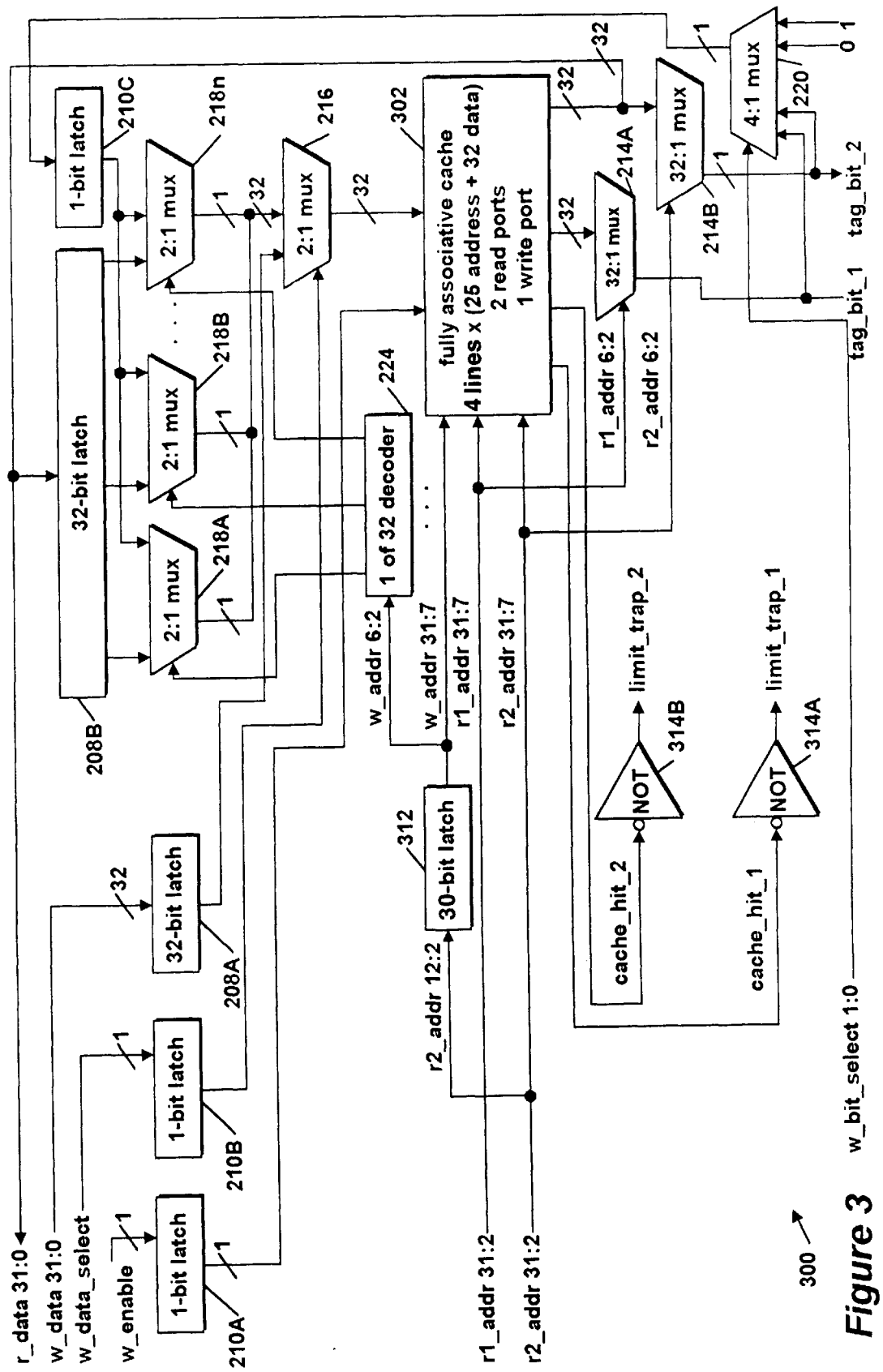
FIG. 3 is a schematic block diagram of a stack tag cache in accordance with a second embodiment of the present invention.

A stack tag cache 300 in accordance with a second embodiment of the invention is illustrated in FIG. 3. All components of stack tag cache 200 which are common with the implementation of stack tag cache 300 are similarly numbered in FIG. 3, the description and operation of such components being described previously herein. A distinction between stack tag cache 200 and stack tag cache 300 is that RAM 202, limit registers 204A–B, and comparators 206A–D are replaced by a fully associative cache 302. In the illustrative embodiment, cache 302 comprises a multiported, fully associative cache with 4 lines, each line consisting of 25 bits of address and 32 bits of data, i.e. tag information for stack entries. Cache 302 has two read ports and one write port, and a "flow-through" capability, such that if the same 32-bit data word, i.e. the data word having the same associated address, is both read and written on the same clock cycle, then the value read from cache 302 is the same as the value being written to cache 302 that clock cycle. When a read address is presented to the cache 302, it produces a corresponding "hit" signal, which is a logical 1 if any of the cache lines currently contains that address.

In addition, a 30-bit latch 312 is utilized in cache 300 in place of the 11-bit latch 212 of cache 200. The structure and function of latch 312 is similar to that previously described with reference to latch 212, except that latch 312 stores 30 bits of the r2_addr signal (r2_addr 31:2) and provides 25 of those bits (w_addr 31:7) to cache 302 and 5 bits (w_addr 6:2) to decoder 224, as illustrated in FIG. 3. Further, a pair of 2-input NOT gates 314A and 314B are coupled to the cache_hit_1 and cache_hit_2 lines, respectively. A value of logical 0 presented by cache 302 to gate 314A will cause the value of limit_trap 1 to be a logical 1, indicating that a cache miss has occurred and a trap routine should be taken. Similarly, a value of logical 0 presented by cache 302 to gate 314B will cause the value of limit_trap_2 to be a logical 1, also indicating that a cache "miss input" has occurred and and a trap routine should be taken.

The operation and function of stack tag cache 300 is similar to that of stack tag cache 200, with the principal differences being in the management of cache misses and loading and unloading of cache 302. In light of the description provided with reference to stack tag cache 200 set forth previously, such operational distinctions will be within the scope of those skilled in the arts and will not be described in further detail.

Exemplary Instruction Executions

To further illustrate operation of the exemplary embodiment of the present invention, the following examples are provided which assume a microprocessor or central processing unit which implements instructions adhering to the Java virtual machine instruction set. For the sake of illustrating maximally efficient instruction timing, the examples assume that the stack data is also kept in a multiported cache memory that has two read ports and one write port, although other data stack implementations may be used.

iadd Instruction

The "iadd" instruction pops two operands from the stack, both of which must be integers. Their sum is then pushed back onto the stack as an integer. The microprocessor reads the two stack operands, adds them, and writes their sum back onto the stack. The stack pointer is also adjusted so as to pop one item off the stack (two pops and one push result in one net pop). With the stack data in a stack data cache, the instruction can all be performed in one clock cycle.

Simultaneously, the CPU generates the memory addresses of the two stack items. The address of the item on top of the stack is presented to RAM 202 as r1_addr while the address of the item below the top of the stack is presented to RAM 202 as r2_addr. Stack tag cache 200 performs the limit comparisons to ensure that tag bits corresponding to the two stack locations are logically within the RAM 202. If the tag bit for the stack location indicated by r1_addr is not within the cache, the limit_trap_1 signal will have a value of logical 1. If the tag bit for the stack location indicated by r2_addr is not within the cache, limit_trap_2 signal will have a value of logical 1.

RAM 202 and the two 32-to-1 multiplexors 214A–B together fetch the tag bits corresponding to the two stack locations and present the tag bits to CPU 105 as tag_bit_1 and tag_bit_2. CPU 105 uses the tag bits for redundant error-checking. Error-checking entails comparing the nature of the stack datum, as indicated by the appropriate tag bits, with the instruction associated with the stack datum. For example, an instruction which operates only with primitive values cannot be executed with operands which are indicated by the tag bits as being references. In this manner, the tag bits not only assist in exact garbage collection techniques, but with verifying the validity of datum within stack entries. Returning to the iadd instruction example, if either bit is a logical 1, the stack location contains a reference and execution of the iadd instruction would be erroneous. The CPU 105 then aborts execution of the instruction. CPU 105 performs a trap if any of tag_bit_1, tag_bit_2, limit_trap_1, limit_trap_2 equals a logical 1. CPU 105 presents the value of logical 1 for the signal w_enable when no trap is to be taken. CPU 105 then presents a logical 0 for w_data_select and a binary value of 10 for w_bit_select. Consequently, if no trap occurs, the tag bit corresponding to the stack item for the result is updated to be a logical 0, indicating that the result is a primitive value. This operation is redundant if the redundant error checking is used to force a trap if the operands are not primitive values. In implementations in which the error checking is not performed, this update is not redundant.

aaload Instruction

The "aaload" instruction pops two items from the stack. The topmost is an integer index, and the item below that is a reference to an array of references. The instruction selects a reference from the array, as indicated by the index value, and then pushes a copy of the selected reference onto the stack. The stack pointer is also adjusted so as to pop one item off the stack, i.e. two pops and one push result in one net pop. This instruction performs a read from main memory and therefore requires multiple clock cycles.

During the first clock cycle, the CPU 105 generates the memory addresses of the two stack items. The address of the item on top of the stack is presented as r1_addr while the address of the item below the top of the stack is presented as r2_addr. Stack tag cache 200 performs the limit comparisons to ensure that the bits corresponding to the two stack locations are logically within the cache. If the tag bit for the stack location indicated by r1_addr is not within the cache, then a logical 1 is produced for the limit_trap_1 signal. If the bit for the stack location indicated by r2_addr is not within the cache, then a logical 1 is produced for the limit_trap_2 signal.

RAM 202 and the two 32-to-1 multiplexors 214A–B together fetch the tag bits corresponding to the two stack locations, presenting them to CPU 105 as tag_bit_1 and tag_bit_2. The CPU 105 can use the tag bits for redundant error-checking with the relevant instruction. A trap should be taken if tag_bit_1 is a logical 1, if tag_bit_2 is a logical 0, or if either limit_trap_1 or limit_trap_2 is a logical 1. On this clock cycle, CPU 105 presents a value of logical 0 for the w_enable signal.

After the selected array element has arrived from main memory, CPU 105 presents on a subsequent clock cycle, the address of the stack result, i.e. the same address of the stack item originally second from the top, as r2_addr again. CPU 105 presents a value of logical 1 for the signal w_enable, a value of logical 0 for w_data_select and a binary of 11 for $w_{13}$ bit_select. Consequently, the tag bit corresponding to the stack item for the result is updated to a logical 1, indicating that the result is a reference value. Such update is redundant if the redundant error checking is used to force a trap when the first operand i.e. the stack entry second from the top is not a reference value. In an embodiment in which the error checking is not performed, such update is not redundant.

iaload Instruction

Execution of the "iaload" instruction is identical in all respects to the "aaload" instruction, except that the array operand is an array of integer values, and the result pushed onto the stack is an integer value rather than a reference. Further, in the last described clock cycle, within the reference to the aaload instruction, CPU 105 presents a binary value of 10 for the w_bit_select signal. Consequently, the tag bit corresponding to the stack item for the instruction result is updated to be a logical 0, indicating that the result is a primitive value. This update is not redundant, as it changes the tag bit from logical 1 to logical 0.

dup Instruction

The "dup" instruction pushes onto the stack a copy of the topmost stack item. CPU 105 reads the topmost stack item and writes it into the stack slot just above. The stack pointer is also adjusted upward and a trap is taken if a stack overflow occurs.

CPU 105 generates the memory addresses of the two stack slots. The address of the item on top of the stack is presented as r1_addr while the address of the slot above, i.e. the item that is about to become the new topmost item, is presented as r2_addr. Stack tag cache 200 performs the limit comparisons to make sure that tag bits corresponding to the two stack locations are logically within the RAM 202. If the tag bit for the stack location indicated by r1_addr is not within the cache, then a logical 1 is produced for the limit_trap_1 signal. If the bit for the stack location indicated by r2_addr is not within the cache, then a logical 1 is produced for the limit_trap_2 signal. A trap is taken if limit trap 1 or limit trap 2 is a logical 1.

RAM 202 and 32-to-1 multiplexors 214A–B together fetch the tag bits corresponding to the two stack locations, presenting them to CPU 105 as tag_bit_1 and tag_bit_2. The tag_bit_2 signal is not used by CPU 105 in handling the "dup" instruction.

CPU 105 presents a value of logical 1 for the w enable signal if no trap is to be taken. CPU 105 presents a value of logical 0 for w_data_select and a binary value of 00 for w_bit_select. Consequently, if no trap occurs, the tag bit corresponding to the stack item for the instruction result is updated to be a copy of tag_bit_1. Therefore, the new, duplicated stack item bears the same tag bit value as the original topmost stack item.

swap Instruction

The "swap" instruction exchanges the topmost stack item with the item second from the top. No net adjustment of the stack pointer occurs. In systems in which the stack data is maintained in a stack data cache, this instruction can be performed in two clock cycles.

On the first clock cycle, the CPU 105 generates the memory addresses of two stack slots. The address of the item on top of the stack is presented to RAM 202 as r1_addr while the address of the slot below the top of the stack is presented to RAM 202 as r2_addr. Stack tag cache 200 performs the limit comparisons to make sure that the tag bits corresponding to the two stack locations are logically within RAM 202. If the tag bit for the stack location specified by r1_addr is not within the RAM 202, then a logical 1 is produced for the limit_trap_1 signal. If the tag bit for the stack location specified by r2_addr is not within RAM 202, then a logical 1 is produced for the limit_trap_2 signal. A trap is taken if either limit_trap_1 or limit_trap_2 is a logical 1. RAM 202 and 32-to-1 multiplexors 214A–B together fetch the tag bits corresponding to the two stack locations, presenting them to CPU 105 as tag_bit_1 and tag_bit_2. The CPU 105 presents a value of logical 1 for the w_enable signal if no trap is to be taken. CPU 105 also presents a value of logical 0 for the w_data_select signal and a binary value of 00 for w_bit_select. Consequently, if no trap occurs, the tag bit corresponding to the stack item second from the top is updated to be a copy of tag_bit_1. The CPU 105 also saves the value presented as tag_bit_2.

On the second clock cycle, CPU 105 generates the memory address of the topmost stack slot, presenting it as r2_addr. CPU 105 presents a logical value of 1 for the w_enable signal and a value of local 0 for the w_data_select signal. CPU 105 presents a binary value of 10 for w_bit_select signal if the saved value of tag_bit_2 from the previous clock cycle was logical 0. CPU 105 presents a binary value of 11 for w_bit_select if the saved value of tag_bit_2 is a logical 1. In this manner, the tag bit corresponding to the topmost stack item is updated to be a copy of the saved tag_bit_2. The net effect is to have swapped the two tag bits for the two stack items.

For dup and swap instruction, it may be readily seen that a tag bit value can be copied directly from one bit location to another within RAM 202 in one clock cycle, the write operation actually being accomplished in the following clock cycle because of the latch delays. Alternatively, a tag bit may be read out on one clock cycle and saved by CPU 105 for later storing into another location in RAM 202 on a later clock cycle.

Given the above description, it will be readily understood how CPU 105 can carry out the necessary copying of tag bit values for instructions dup2, dup_x1, dup_x2, dup2_x1, and dup2_x2, as well, a detailed description of which will not be provided herein for brevity.

iload Instruction

The "iload" instruction pushes onto the stack a copy of an integer stack item whose address is computed as an offset from the frame pointer. The address is used to fetch the value of an integer method parameter or local variable.

CPU 105 reads a stack item and writes the item into the stack slot just above the topmost stack item. The stack pointer is also adjusted upward. A trap is taken if a stack overflow occurs. If the stack data resides in a stack data cache, the instruction can be performed in one clock cycle. The operation of the iload instruction is much like that for the dup instruction, the principal difference being that the operand is required to be an integer. Tag_bit_1 therefore can be checked to ensure a value of logical 0, and the tag bit of the result will be a logical 0. Therefore, the w_bit_select signal may be a binary 10 instead of a binary 00.

For a method whose frame is larger than RAM 202, there are at least two options. First, stack tag cache 200 may forego redundant error checking that the operand is not a reference. Second, and alternatively, a trap can be taken, leaving CPU 105 to emulate the instruction.

In the preferred embodiment, CPU 105 generates the memory addresses of the two stack slots. The address computed as an offset from the frame pointer is presented as r1_addr while the address of the slot above the current top of the stack, i.e. the item about to become the new topmost item, is presented as r2_addr. Stack tag cache 200 performs the limit comparisons, however, if the limit_trap_1 signal is a logical 1 a trap will not be taken. Instead, a trap is taken if limit_trap_1 is logical 0 and tag_bit_1 is logical 1, or, limit_trap_2 is logical 1. Thus redundant error checking is performed if the necessary tag bit happens to be in stack tag cache 200. Otherwise, the redundant error check is not performed, rather than taking a trap.

Data to be pushed onto the stack may arrive during the same cycle or on a later cycle. In whichever cycle the data is actually to be written into the stack slot that becomes the new top-of-stack item, CPU 105 presents a value of logical 1 for the w_enable signal if no trap is to be taken. CPU 105 also presents a value of binary 10 for the w_bit_select signal. Consequently, the tag bit corresponding to the stack item for the instruction result is updated to be a logical 0, indicating that the result is a primitive value.

istore Instruction

The "istore" instruction pops an integer from the stack and stores it into a stack slot whose address is computed as an offset from the frame pointer, i.e. the item is used to update the value of an integer method parameter or local variable. CPU 105 reads the topmost stack item and writes it into the addressed stack slot. The stack pointer is also adjusted downward. A trap is taken if stack underflow occurs.

For a method whose frame is larger than RAM 202, it is necessary to take a trap, since the tag bit for the candidate stack storage slot stored into must be updated to maintain correct behavior of the invention. CPU 105 must then emulate the operation of the instruction, including the updating of the tag bit associated with the updated stack slot.

CPU 105 generates the memory addresses of the two stack slots. The address that is computed as an offset from the frame pointer is presented as r2_addr while the address of the current top of the stack, i.e. the item about to be popped, is presented as r1_addr. Stack tag cache 200 performs the limit comparisons. RAM 202 and the 32-to-1 multiplexors 214A–B together fetch the tag bits corresponding to the two stack locations, presenting them to CPU 105 as tag_bit_1 and tag_bit_2. CPU 105 can then use these tag bits for redundant error-checking. A trap should be taken if any of tag_bit_1, limit_trap_1 to or limit_trap_2 is a logical 1. The tag_bit_2 signal is not used by CPU 105 in handling the istore instruction. CPU 105 presents a value of logical 1 for the w_enable signal if no trap is to be taken. CPU 105 also presents a binary value of 10 for the w_bit_select signal. Consequently, the tag bit corresponding to the stack item for the instruction result is updated to logical 0, indicating that the result is a primitive value.

When a trap occurs because either limit_trap_1 or limit_trap_2 is logical 1, CPU 105 must examine the instruction that caused the trap as well as other information provided by a trap handler routine and take appropriate action. If the instruction needed to access a tag bit for a stack slot outside the bounds indicated by tag_stack_low_limit or tag_stack_high_limit, CPU 105 can load the necessary tag bits into RAM 202 and adjust the values in tag_stack_low_limit and tag_stack_high_limit accordingly. It may be necessary to first make room in the stack tag cache by reading data from RAM 202 and storing it into main memory 110.

Quick Instruction Considerations

For Java implementations that use "quick" instructions that are indiscriminate as to whether an operand that is a field of an object is a reference or primitive data, the invention contemplates the addition of new instructions that perform all relevant discriminations.

The Java mechanism that replaced slower instructions with quick instructions after symbolic name resolution is either the Java interpreter or a "just-in-time" computer, also referred to as a JIT compiler, or both. In the preferred embodiment, the Java interpreter and/or JIT compiler are modified so as to choose one of two possible quick instructions as replacement instructions. This choice is made so as not to lose information about whether or not any particular object field operand is a reference. The following semi-standard JVM quick instructions are construed always to operate on primitive values:

getfield_quick
    getfield_quick_w
    getstatic_quick
    ldc_quick
    ldc_w_quick
    putfield_quick
    putfield_quick_w
    putstatic_quick The additional quick instructions of the present invention, which are exactly like the corresponding existing semi-standard JVM quick instructions listed previously, but which operate on reference values are as follows:

agetfield_quick
    agetfield_quick_w
    agetstatic_quick
    aldc_quick
    aputfield_quick
    aputfield_quick_w
    aputstatic_quick Whenever the slower instructions, getfield, getstatic, ldc, ldc_w, putfield, putstatic, are to be replaced during the process of executing the slower instruction by a quick instruction, a quick instruction whose name begins with "a" is chosen if the symbolic name resolution process determines that the datum to be transferred to or from the stack will be a reference. Otherwise, the usual quick instruction is chosen. For example, the instruction agetfield_quick is identical in its function to getfield_quick, except in that it transfers a reference value. Similar analogies are true for the other seven cited quick instruction types.

In the preferred embodiment, Java bytecode instruction set opcodes are assigned to the new instructions as follows:

232 agetfield_quick
    233 agetfield_quick_w
    234 agetstatic_quick
    235 aldc_quick
    236 aldc_w_quick
    231 aputfield_quick
    229 aputfield_quick_w
    230 aputstatic_quick agetfield_quick Instruction The "agetfield_quick" instruction pops from the stack a reference to an object and then pushes onto the stack a copy of a reference value whose address is computed as an offset within the object. The reference is used to fetch the value of a reference-valued field of the object. Operation of the agetfield_quick instruction is similar to the "aaload" instruction, except that a single operand, an object reference, is popped from the stack, rather than an array reference and an integer index.

It will be obvious to those reasonably skilled in the arts that minor variations in the exact timing of read and write operations of the invention stack tag cache may occur while maintaining the spirit and scope of the invention. For example, writing a word of tag information into RAM 202 may occur on the same clock cycle in which the information is read from RAM 202, rather than on the following clock cycle.

In yet another alternate embodiment, the invention may be implemented as a computer program product for use with a computer system. In such an implementation, the tag information may be stored in a second area of the same system RAM that is used to store the stack items. In this embodiment, the tag information may be retrieved and stored directly in the system RAM, thereby omitting the function of the hardware cache memory 202 and the need for address limit checks and a trap instruction to process a cache "miss". Alternatively, the function of cache memory 202 can be implemented by a different system RAM device, such as a portion of a fast static RAM, which is also used for other purposes. In this latter embodiment, all the functions performed by hardware components within stack tag cache 200 or stack tag cache 300 may be replaced in their entirety with corresponding processor instructions, which perform analogous functions to achieve the same results. In this embodiment, the tag bit information for each stack entry may be stored with a system RAM. Specific instructions, executable by the processor, read, write, and modify the tag bit information within RAM. Any number of programming languages including most processor instruction sets, assembly languages and the C programming language provide facilities which allow for the manipulation of individual bits within a data word, and would be suitable for implementation of such and all software embodiment of the invention. In light of the foregoing description of the logic components comprising stack tag caches 200 and 300, the basic process steps used to implement analogous functions will be within the scope of those skilled in the programming arts and are shown in schematic form in FIGS. 4 and 5.

Figure 4:
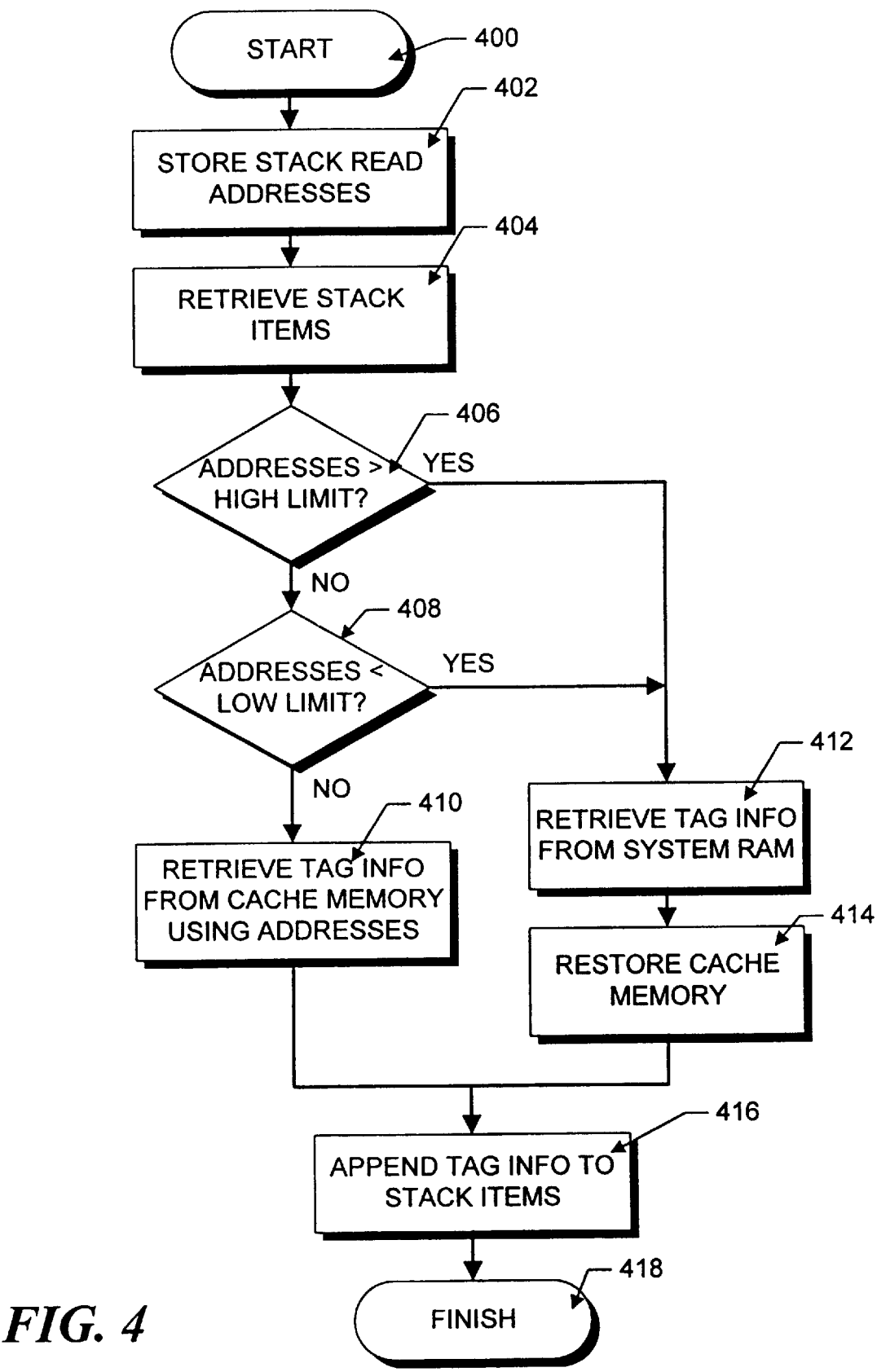
FIG. 4 is a flowchart of an illustrative routine implementing a method for retrieving stack tag information during a stack item read operation.

FIG. 4 is an illustrative flowchart of the steps which could be performed by a hardware or software embodiment of the invention to retrieve tag information during a program stack read. The method starts in step 400 and proceeds to step 402 in which, depending upon the implementation, one or two read addresses are generated and stored. If a single stack is being processed, a single address is used; the second address can be used if two stacks are being processed simultaneously as described above in connection with the hardware implementation. These addresses specify the stack item location and, as previously mentioned, are also used to address the stack cache or another location of system RAM where the tag information is stored.

In step 404, the stack items which are in locations designated by the addresses stored in step 402 are retrieved. Then, in step 406, the addresses are checked against a high trap limit, and, in step 408, the addresses are checked against a low trap limit. If the addresses fall outside the address interval defined by the respective trap limits, then as previously discussed, trap processing is initiated. This processing results, in step 412, in the requested tag information being retrieved from system RAM. In step 414, a mechanism is initiated to restore the cache memory by storing at least the tag information retrieved from the system RAM and, possibly, storing additional tag information in the cache memory in accordance with the discussion above. In step 416, the retrieved tag information is appended to the stack items retrieved in step 404 and the routine finishes in step 418.

Figure 5:
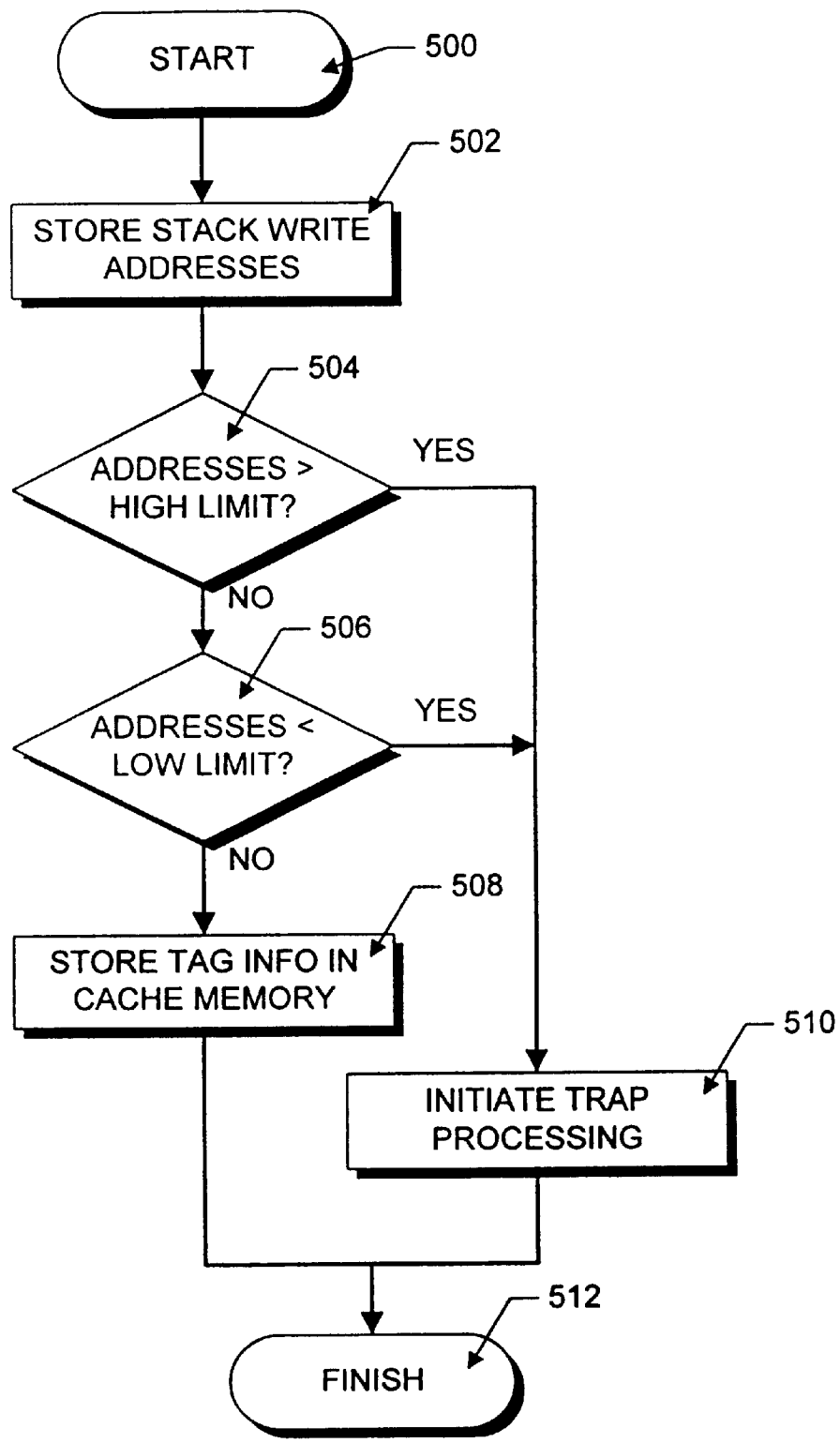
FIG. 5 is a flowchart of an illustrative routine implementing a method for retrieving stack tag information during a stack item write operation.

A similar method is used to store tag information during a program stack write operation. This method is shown in FIG. 5 and begins in step 500. The routine then proceeds to step 502 where a write address is stored, which address corresponds to the program stack location where a stack item is to be written. The stored address is compared to the high trap limit in step 504 and the low trap limit in step 506. If the address falls within the address interval defined by the trap limits, the routine proceeds to step 508 where tag information is stored in the cache memory at a location determined from the program stack write address.

Alternatively, if the address stored in step 502 falls outside the trap limits as determined by either steps 504 or 506, then trap processing is initiated in step 510. As previously mentioned, this trap processing may be conducted in accordance with conventional cache memory "miss" processing. For example, the tag information may be written into both the cache memory and a system RAM memory location or the information may be written into the cache memory and later "flushed" to the system RAM location in a manner well known to those skilled in the art.

In either of steps 508 and 510, the result is that required tag information is stored in the cache memory. The routine then finishes the step 512.

A software implementation may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. For example, although stack tag cache 200 and 300 have been described with implementations using hardware logic components, the methods of the invention may likewise be achieved in either all software implementations, using the appropriate processor instructions, or in hybrid implementations which utilize a combination of hardware logic and software logic to achieve the same results. Further, aspects such as the size of memory, number of bits utilized to represent datum or a signal, data word size, the number of clock cycles necessary to execute an instruction, and the specific configuration of logic and/or instructions utilized to achieve a particular function, as well as other modifications to the inventive concept are intended to be covered by the appended claims.

What is claimed is:

1. In a computer system capable of maintaining in a first memory area a program data stack having a plurality of stack items, each of the plurality of stack items comprising data which is definable as either a reference or a primitive value, a method for determining whether data in a selected program stack item is a reference or a primitive value, the method comprising the steps of:

A. maintaining in a second memory area a plurality of tag items, each of the plurality of tag items associated with a stack item, each tag item having a value indicating whether the associated stack item is a reference or a primitive value;

B. retrieving one of the plurality of tag items which is associated with the selected stack item; and C. determining from the value of the retrieved tag item whether the data contained within the associated stack item is a reference or a primitive value.

2. The method of claim 1, wherein step A comprises the steps of:

A.1. arranging the plurality of tag items into an order which emulates at least a portion of the program stack; and A.2. selectively manipulating tag items in response to manipulation of the program stack.

3. The method of claim 2, wherein step A.2 further comprises the step of:

A.2.A. manipulating the order of selected tag items in response to manipulation of the order of selected stack items.

4. The method of claim 2, wherein step A.2 further comprises the step of:

A.2.A. manipulating the value of a tag item in response to manipulation of the data of a corresponding stack item.

5. The method of claim 1 wherein step B comprises the step of:

B.1 determining whether the tag item corresponding to the selected stack item is resident within the second memory area.

6. The method of claim 5 wherein step B.1 further comprises the step of:

B.2 if the tag item is not resident in the second memory area, retrieving the tag item from a third memory area and writing the tag item into the second memory area.

7. The method of claim 1 wherein step B further comprises the step of:

B.1 providing to the second memory area an address corresponding to the location of the associated tag item.

8. The method of claim 1 wherein step C further comprises the steps of:

C.1 presenting at an output of the second memory area, a value of the retrieved tag item; and C.2 comparing the presented value of the tag item with the data of the corresponding stack item.

9. The method of claim 1 wherein step B further comprises the steps of:

B.1 selecting simultaneously with a first tag item, a second of the plurality of tag items which corresponds to a second selected stack item, and B.2 determining from the value of the second selected tag item whether the data contained within the associated second stack item is a reference or a primitive value.

10. A stack tag cache for use with a computer system having a program data stack comprising a plurality of stack entries, each stack entry containing data used by the computer system during execution of a task, the stack tag cache comprising:

A. an addressable memory configured to store a plurality of tag items, each tag item associated with a stack entry and having a value identifying whether the associated stack entry is a reference or a primitive value;

B. comparative logic coupled to the addressable memory and configured to determine whether a tag item associated with a selected stack entry is resident within the addressable memory; and C. output logic, responsive to an address supplied to the addressable memory, configured to present a value for the tag item selected by the address and associated with the selected stack entry.

11. The apparatus of claim 10 further comprising:

D. write logic configured to retrieve a tag item from memory outside the addressable memory if the comparative logic determines that a tag item associated with a selected stack entry is not resident within the addressable memory and configured to write the retrieved tag item in the addressable memory.

12. The apparatus of claim 10 further comprising a write logic configured to determine whether first and second tag items associated with the first and second selected stack entries, respectively, are resident within the addressable memory.

13. The apparatus of claim 10, wherein the output logic is responsive to first and second addresses and configured to present the values of first and second tag items corresponding to first and second selected stack entries, respectively.

14. The apparatus of claim 10 wherein the plurality of tag items stored in the addressable memory is less than the plurality of program stack entries.

15. A computer system comprising:

a processor;

a memory coupled to the processor;

program stack logic operatively coupled to the processor and the memory and configured to store a plurality of stack entries and manipulate the stack entries during program instruction execution, each stack entry accommodating data useful in execution of program instructions and comprising a data portion and a tag portion, the tag portion containing information indicating which of a plurality of predefined operand types the data represents;

the data portion of each program stack entry stored in a first area of memory, the arrangement and values of the data portions being manipulated by the processor during execution of the program instructions by the processor;

the tag portion of each of the plurality of program stack entries being stored in a second area of memory, the arrangement and values of the tag portions being manipulated in a correlated manner with the data portions of the corresponding program stack entries.

16. The computer system of claim 15 further comprises: a stack tag cache, operatively coupled to the processor and the second area of the memory, and configured to store a selected plurality of the tag portions separately from the datum portion of each stack entry and to manipulate the arrangement and value of the tag portions.

17. The computer system of claim 15 further comprising a stack tag cache that comprises:

comparative logic configured to determine whether the tag portion of a program stack entry is resident within the stack tag cache.

18. The computer system of claim 15 further comprising a stack tag cache that comprises:

output logic, responsive to an address supplied to the stack tag cache, and configured to present a value for the tag portion of a program stack entry, as selected by the supplied address.

19. The computer system of claim 16 wherein the number of tag portions within the stack tag cache is less than the number of stack entries.

20. A computer program product for use with a computer system having a processor, a memory and program stack logic configured to store a plurality of stack entries in a first memory area and manipulate the stack entries during program instruction execution, each stack entry capable of accommodating data definable as either a reference or a primitive value, the computer program product comprising a computer usable medium, having program code embodied in the medium for causing the computer system to discriminate the stack entries as either references or primitive values, the program code comprising:

program code for causing the computer system to maintain in a plurality of tag items in a second memory area, each tag item associated with a stack entry;

program code for causing the computer system to retrieve one of the plurality of tag items which corresponds to a selected stack item; and program code responsive to the program code for causing the computer system to retrieve, for causing the computer system to present a value for the tag item associated with the selected stack entry.

21. The computer program product of claim 20, wherein the program code for selecting further comprises:

program code for determining whether a tag item corresponding to the selected stack entry is resident within the second memory area.

22. The computer program product of claim 20, wherein the program code for selecting further comprises:

program code for retrieving a tag item not resident within the second memory area and for writing the tag item into the second memory area.

23. The computer program product of claim 20, further comprising:

program code for selecting simultaneously a second of the plurality of the tag items which corresponds to a selected second stack entry.

24. The computer program product of claim 20 wherein each tag item has a value which indicates whether the data contained within the corresponding stack entry is a reference or a primitive value.

25. Apparatus for performing garbage collection on a computer system having a memory, the apparatus comprising:

program stack logic configured to store a plurality of stack entries in the memory and to manipulate the stack entries during program instruction execution, each stack entry accommodating data useful in execution of program instructions and comprising a data portion and a tag portion, the tag portion containing information indicating which of a plurality of predefined operand types the data represents;

a first storage element configured to store the data portion of each program stack entry stored in a first memory area, the arrangement and values of the data portions being manipulated during program instruction execution;

a second storage element configured to store the tag portion of each of the plurality of program stack entries in a second memory area different from the first memory area, the arrangement and values of the tag portions being manipulated in a correlated manner with the data portions of the corresponding program stack entries; and a garbage collection mechanism operable which examines the second memory area in order to determine the address of the unused memory locations and reclaims the unused memory locations.

26. The apparatus of claim 25 wherein the second memory area is a cache memory which is separate from the memory.

27. The apparatus of claim 25 wherein the tag portion of each of the plurality of program stack entries indicates whether the program stack entry is a reference or primitive data.

28. The apparatus of claim 26 wherein the garbage collection mechanism determine the address of the unused memory locations by using the data portion of each program stack entry stored in a first memory area for which the associated tag portion indicates that the program stack entry is a reference.

29. A method for use in a computer system having a memory with a plurality of words, a program data stack having a plurality of stack items in the memory, each of the plurality of stack items comprising data which is definable as either a reference or a primitive value, the method determining whether data in a selected program stack item is a reference or a primitive value and comprising the steps of:

A. associating a tag item with each memory word only when the memory word is designated as a stack item, the tag item having a value indicating whether the associated stack item is a reference or a primitive value; and B. determining from the value of a tag item associated with the selected stack item whether the data contained within the selected stack item is a reference or a primitive value.

30. Apparatus for use in a computer system having a memory with a plurality of words, a program data stack having a plurality of stack items in the memory, each of the plurality of stack items comprising data which is definable as either a reference or a primitive value, the apparatus determining whether data in a selected program stack item is a reference or a primitive value and comprising:

a tag cache mechanism which associates a tag item with each memory word only when the memory word is designated as a stack item, the tag item having a value indicating whether the associated stack item is a reference or a primitive value; and a utilization mechanism which determines from the value of a tag item associated with the selected stack item whether the data contained within the selected stack item is a reference or a primitive value.

31. A computer program product for use in a computer system having a memory with a plurality of words, a program data stack having a plurality of stack items in the memory, each of the plurality of stack items comprising data which is definable as either a reference or a primitive value, the computer program product determining whether data in a selected program stack item is a reference or a primitive value and comprising a computer usable medium having computer readable program code thereon, including:

program code for associating a tag item with each memory word only when the memory word is designated as a stack item, the tag item having a value indicating whether the associated stack item is a reference or a primitive value; and program code for determining from the value of a tag item associated with the selected stack item whether the data contained within the selected stack item is a reference or a primitive value.

* * * * *